J. J. O'DONNELL.
NUT LOCK FOR RAIL JOINTS.
APPLICATION FILED JAN. 7, 1909.
948,823.
Patented Feb. 8, 1910.
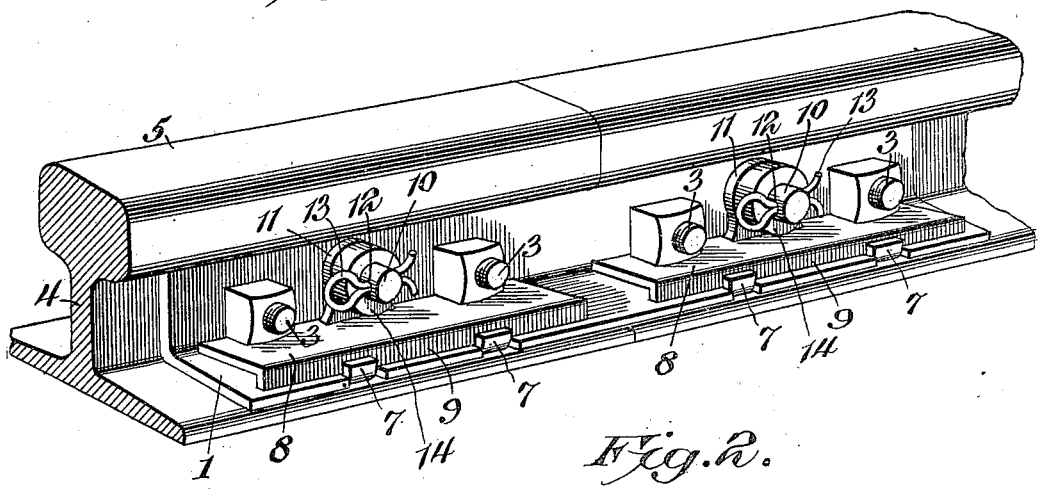
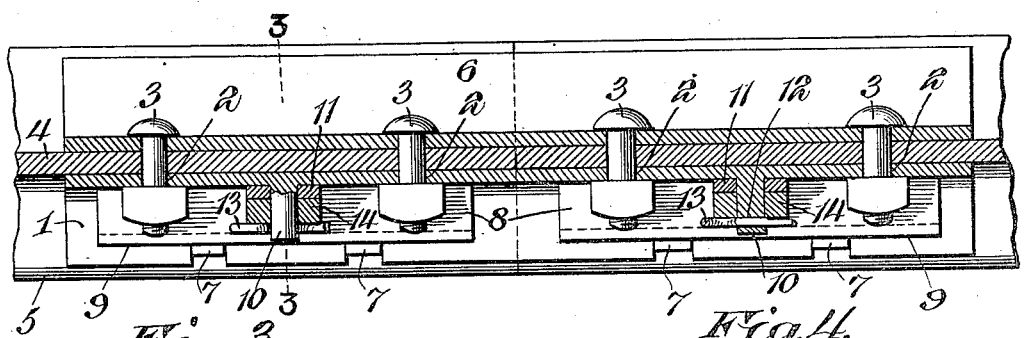
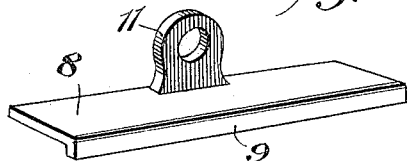
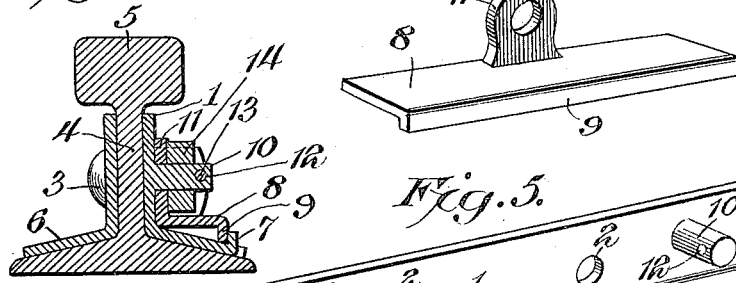
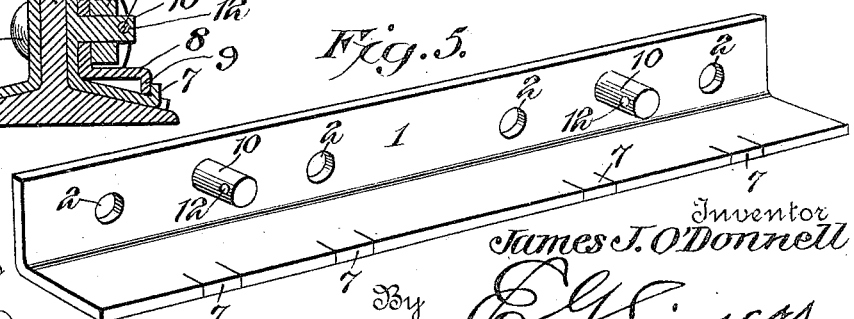
Witnesses
Howard N. Orr
H. H. Riley
Inventor
James J. O'Donnell
By C. G. Siggers
Attorney

UNITED STATES PATENT OFFICE.

JAMES JOSEPH O'DONNELL, OF PADUCAH, KENTUCKY.

NUT-LOCK FOR RAIL-JOINTS.

948,823.  Specification of Letters Patent.  Patented Feb. 8, 1910.

Application filed January 7, 1909. Serial No. 471,179.

*To all whom it may concern:*

Be it known that I, JAMES JOSEPH O'DONNELL, a citizen of the United States, residing at Paducah, in the county of McCracken and State of Kentucky, have invented a new and useful Nut-Locks for Rail-Joints, of which the following is a specification.

The invention relates to improvements in nut locks for rail joints.

The object of the present invention is to improve the construction of nut locks for rail joints, and to provide a simple, inexpensive and efficient nut lock, designed for use at all places on a railroad track, and capable of securely locking a plurality of nuts against accidental unscrewing, and of enabling the same to be readily removed when desired.

The invention also has for its object to provide a nut lock of this character, which will not necessitate any alteration in the construction of the bolts and nuts, and it may be readily applied to an ordinary rail joint.

With these and other objects in view, the invention consists in the construction and novel combination of parts hereinafter fully described, illustrated in the accompanying drawing, and pointed out in the claims hereto appended; it being understood that various changes in the form, proportion, size and minor details of construction, within the scope of the claims, may be resorted to without departing from the spirit or sacrificing any of the advantages of the invention.

In the drawing:—Figure 1 is a perspective view of a rail joint provided with a nut lock, constructed in accordance with this invention. Fig. 2 is a horizontal sectional view of the same. Fig. 3 is a transverse sectional view on the line 3—3 of Fig. 2. Fig. 4 is a detail perspective view of the nut locking plate or member. Fig. 5 is a similar view of the fish plate.

Like numerals of reference designate corresponding parts in all the figures of the drawing.

The nut lock comprises in its construction an angle fish plate 1, provided in its vertical flange or portion with bolt openings 2 for the passage of bolts 3 of a rail joint. The fish plate 1, as clearly illustrated in Fig. 2 of the drawing, forms one of the fish plates of a rail joint, which is provided at intervals in the usual manner with the bolts 3. The bolts 3 pierce the fish plate 1, the webs 4 of rails 5 and the fish plate 6 at the opposite side of the rail. The fish plate 6 is of the ordinary construction and may either consist of a flat plate, or an angle fish plate may be employed. The fish plate 1 is provided at the outer edge of its lower flange or portion with bendable lugs 7, formed by splitting the fish plate transversely and adapted to engage a nut locking plate or member 8. The lugs 7 are preferably formed by short parallel cuts and are adapted to be bent upward into engagement with the nut locking plate or member at the outer edge thereof.

The nut locking plate or member 8 is horizontally disposed to present a flat upper face to the lower horizontal edges of the contiguous nuts, and it is provided at its outer edge with a depending longitudinal flange 9, resting upon the outer portion of the lower flange of the fish plate 1, and supporting the outer portion of the locking plate above and in spaced relation with the fish plate. The inner edge of the nut locking plate or member fits against the vertical portion of the fish plate and rests upon the bottom portion, which is inclined. The depending flange 9 is of a height to correspond with the inclination of the bottom portion of the fish plate, and supports the nut locking plate or member in a horizontal position. The lugs 7 are bent up against the outer face of the flange 9 and hold the nut locking plate or member against outward movement. The nut locking plate or member is preferably of a length to engage a pair of nuts, as illustrated in the accompanying drawing, and the vertical portion of the fish plate 1 is provided between each pair of bolt openings with a horizontal stud 10, and the locking plate or member has an upwardly extended ear 11 at its inner edge. The stud extends through the ear and is provided with a perforation 12 for the reception of a key 13, a collar 14 being preferably interposed between the key and the ear, as shown. The locking action of the key increases the efficiency of the nut lock, but this additional locking means may be omitted if desired.

Having thus fully described my invention, what I claim as new and desire to secure by Letters Patent, is:—

1. A nut lock for rail joints including an angle fish plate having an inclined lower portion provided at the outer edge with bendable lugs located at points intermediate of the ends of the fish plate and formed by splitting the same, a horizontal locking plate presenting a flat upper face to the nuts of the rail joint and supported at its inner edge upon the inclined portion of the fish plate and having its outer portion bent downwardly to form a flange, said flange resting upon the inclined portion of the fish plate and engaged by the lugs thereof and supporting the outer portion of the locking plate above and in spaced relation with the fish plate.

2. A nut lock for rail joints including an angle fish plate provided in its vertical portion with bolt openings and having a plurality of horizontal studs located between the openings, a plurality of nut locking plates arranged upon the lower portion of the fish plate and provided at their outer edges with depending flanges supporting the locking plates in their horizontal position, said locking plates being provided at their inner edges with ears arranged on the said studs, and means for securing the ears to the studs to retain the nut locking plates in engagement with the nuts.

3. A nut lock for rail joints including an angle fish plate provided at the outer edge of its lower portion with bendable lugs and having bolt openings in its vertical portion, said fish plate being also provided between the bolt openings with horizontal studs, nut locking plates provided at their outer side edges with depending flanges supporting the nut locking plate in a horizontal position and engaged by the lugs of the fish plate, said nut locking plates being provided at their inner edges with ears arranged on the studs, and means for retaining the ears on the studs.

In testimony, that I claim the foregoing as my own, I have hereto affixed my signature in the presence of two witnesses.

JAMES JOSEPH O'DONNELL.

Witnesses:
   D. H. HUGHES,
   R. H. DORSEY.